United States Patent
Sekine

(10) Patent No.: US 6,421,601 B2
(45) Date of Patent: Jul. 16, 2002

(54) VEHICLE SAFETY RUNNING APPARATUS

(75) Inventor: Hiroshi Sekine, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/825,959

(22) Filed: Apr. 5, 2001

(30) Foreign Application Priority Data

Apr. 28, 2000 (JP) ........................................ 2000-129752

(51) Int. Cl.[7] .............................................. F16H 61/02
(52) U.S. Cl. ........................... 701/200; 701/51; 701/54; 701/208; 340/995
(58) Field of Search ......................... 701/200, 51, 54, 701/55, 208, 209, 214; 340/901, 995, 437, 466

(56) References Cited

U.S. PATENT DOCUMENTS 5,539,397 A * 7/1996 Asanuma et al. ............ 340/901
6,199,001 B1 * 3/2001 Ohta et al. .................. 701/208

FOREIGN PATENT DOCUMENTS

JP 7-229745 8/1995
JP 8-194896 7/1996

* cited by examiner

Primary Examiner—William A. Cuchlinski, Jr.
Assistant Examiner—Marthe Y. Marc-Coleman
(74) Attorney, Agent, or Firm—Arent Fox Kintner Plotkin & Kahn, PLLC

(57) ABSTRACT

In a vehicle safety running apparatus, when a route guidance by a navigation system is not in operation, a determination on passableness is carried out as a target on a branch road of a plurality of branch roads branched from an intersection ahead of the subject vehicle which has lowest with respect to the degree of difficulty in running or a branch road having a smallest intersection angle formed by a road on which the subject vehicle is advancing and the branch road and a curve on the branch road, whereby an automatic deceleration control can be performed or an alarm can be given to the driver even when the route guidance is not in operation, and moreover the automatic deceleration control and/or alarming the driver is prevented from being performed unnecessarily, thereby making it possible to suppress to a minimum level the physical disorder that the driver may feel.

6 Claims, 8 Drawing Sheets

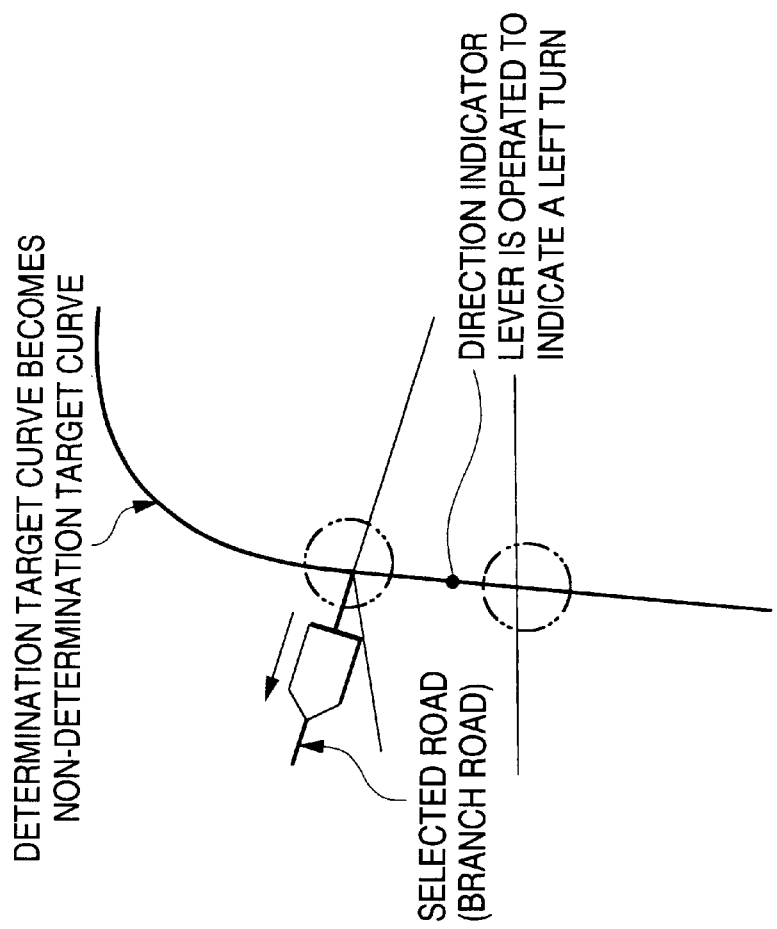
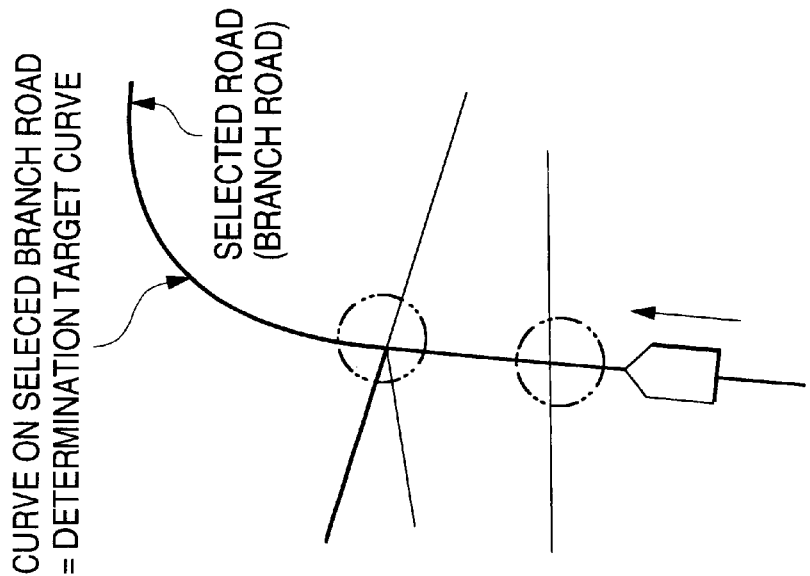

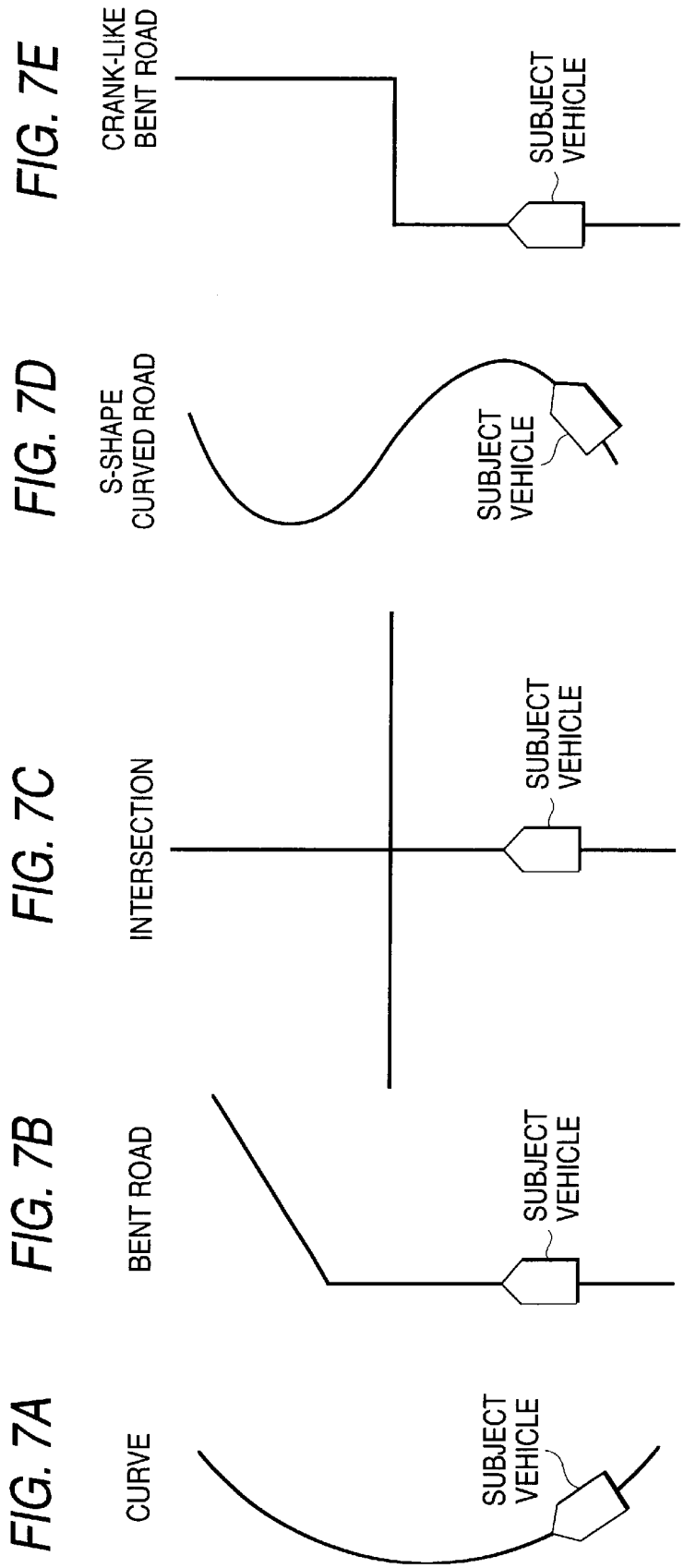

VEHICLE SAFETY RUNNING APPARATUS

BACKGROUND OF THE INVENTION

1. Field of the Invention

The present invention relates to a vehicle safety running apparatus for a vehicle provided with a so-called navigation system, and more particularly to a vehicle safety running apparatus for allowing a subject vehicle to pass through intersections and curves in front thereof exactly even when a route to a destination is not set.

2. Description of the Related Art

A Japanese Patent Unexamined Publication No. Hei. 8-194896(JP-A-8-194896) describes a safety running apparatus for preventing the execution of improper automatic deceleration or alarming the driver when the driver does not follow a route guidance at intersections by excluding them from objects for control in a case where vehicle speed control and/or alarming is executed according to the shapes of curves coming up in front of a subject vehicle along a road on which the subject vehicle is traveling while a route guidance by a navigation system is being carried out.

In addition, a Japanese Patent Unexamined Publication No. Hei. 7-229745(JP-A-7-229745) discloses a safety running apparatus for executing automatic deceleration control and alarming against a route to be taken by a subject vehicle after the subject vehicle deviates from its route by alarming the driver in the event that the subject vehicle deviates from its route or a deviation of the subject vehicle from its route is anticipated while a route guidance by a navigation system is being carried out.

In order to execute proper automatic deceleration control and alarming for a subject vehicle to securely pass along a road in front thereof the driver is required to grasp the shapes of roads based on a future route for him or her to take. To this end, conventionally, while a route guidance by a navigation system is being carried out and in a case where a route that will be followed by the subject vehicle in the future can be anticipated, the automatic deceleration control and/or alarming is carried out based on the shapes of roads along a set route. However, there occurs a case where the route guidance by the navigation system is not executed on roads that are used very frequently or are known to the driver. Alternatively, there occurs a case where the subject vehicle deviates its route even when the route guidance is being carried out, and in such a case, the conventional safety running apparatus has faced a problem that it cannot execute precise vehicle speed control and alarming.

In order to improve the safety in driving the subject vehicle when the route guidance by the navigation system is not in operation, it is considered to select a branch road which is the most difficult for the subject vehicle to pass through such as a branch road having a largest intersection angle relative to a road on which the subject vehicle is running or a branch road having a curve having a smallest radius of curvature and then to control the vehicle speed or alarm the driver so that the subject vehicle can pass through the branch road safely. However, with such a system in operation, even in the event that the subject vehicle enters a branch road which is not the branch road so selected, the control or alarming is still activated and it follows that the unnecessary control or alarming is executed. Thus, the driver may feel uncomfortable.

SUMMARY OF THE INVENTION

The invention was made in view of these situations, and an object thereof is to enable the precise execution of controlling the vehicle speed and alarming the driver according to the shape of a road ahead of the subject vehicle.

With a view to attaining the object, according to a first aspect of the invention, there is provided a vehicle safety running apparatus comprising a storage means for storing road data including intersections and a subject vehicle position detecting means for detecting the position of a subject vehicle, a route setting means for setting a route to a destination, a vehicle condition detecting means for detecting the vehicle condition of the subject vehicle including at least the vehicle speed thereof, a bend portion detecting means for detecting curves and intersections existing along the traveling direction of the subject vehicle based on the road data stored in the storage means and the subject vehicle position detected by the subject vehicle position detecting means and a proper condition determining means for calculating, based on information on curves and intersections detected by the bend portion detecting means proper vehicle conditions for passing through the curves and intersections and determining whether or not the subject vehicle can properly pass through the curves and intersections based on the result of a comparison of the proper vehicle condition so calculated with the vehicle condition detected by the vehicle condition detecting means; the vehicle safety running apparatus further comprising a running difficulty determining means for determining the degree of difficulty in running on a road on which the subject vehicle is traveling, whereby when the bend portion detecting means detects an intersection branching into a plurality of branch roads in a state in which a route guidance based on a set route is not carried out, the proper condition determining means selects a branch road determined by the running difficulty determining means as having a lowest degree of difficulty in running and determining whether or not the subject vehicle can pass through the branch road.

According to the configuration as described above, since a branch road of branch roads at an intersection ahead of the subject vehicle along a road on which the subject vehicle is traveling which has the lowest degree of difficulty in running is selected to determine whether or not the subject vehicle can pass therethrough in the state in which the route guidance along a set route is not carried out, it is possible to determine whether or not the subject vehicle can pass through the branch road even in a case where no route to a destination is not set. Moreover, the possibility that automatic deceleration control and/or alarming is performed excessively can be reduced by selecting a branch road which is easy for the subject vehicle to pass through, thereby making it possible to suppress to a minimum level the physical disorder that the driver feels. In addition, even in the event that the subject vehicle happens to enter a branch road which is difficult for the subject vehicle to pass through, since in many cases the driver drives the vehicle without depending on the route guidance when he or she has already been aware of the existence of an intersection ahead of the subject vehicle or is then determined on which turn to take at the intersection, it is most unlikely that the subject vehicle enters the branch road which is difficult for it to pass through with excessive vehicle speed.

Additionally, according to a second aspect of the invention, there is provided a vehicle safety running apparatus as set forth in the first aspect of the invention, wherein the storage means is configured to store road data through nodes and links, and wherein the running difficulty determining means is configured to determine that a branch road having a smaller intersecting angle formed by links immediately before and after a node set at an intersection is lower in the degree of difficulty in running.

According to the configuration as described above, it is possible to determine exactly a branch road having a lowest degree of difficulty in running by selecting a branch road having a smallest intersection angle formed by links located before and after a node set at an intersection.

Furthermore, according to a third aspect of the invention, there is provided a vehicle safety running apparatus as set forth in the first or second aspect of the invention, wherein the proper condition determining means determines whether or not a curve on a branch road selected by the proper condition determining means can be passed along.

According to the configuration as described above, since whether or not the subject vehicle can pass through the selected curve on the branch road is determined, it is possible to perform an accurate automatic deceleration control and/or give an alarm to the driver by determining whether or not a curve along which the subject vehicle is anticipated to pass.

Moreover, according to a fourth aspect of the invention, there is provided a vehicle safety running apparatus as set forth in the third aspect, wherein the proper condition determining means cancels its determination on whether or not the curve on the branch road selected by the proper condition determining means can be passed along when the subject vehicle starts to advance on a branch road other than the branch road selected by the proper condition determining means.

According to the above configuration, when the subject vehicle advances on a branch road other than the selected branch road, since the determination of the passableness of the selected curve on the selected branch road is cancelled, it is possible to prevent the execution of the automatic deceleration control and/or alarming the driver for the curve along which the subject vehicle is passing in no case then.

In addition, according to a fifth aspect of the invention, there is provided a vehicle safety running apparatus as set forth in any of the first to third aspects of the invention, wherein the proper condition determining means cancels its selection of a branch road when direction indicators of the subject vehicle indicate before the intersection that the subject vehicle is advancing on a branch road other than a branch road selected by the proper condition determining means.

According to the above configuration, in a case where a branch road selected by the proper condition determining means is different from a branch road indicated by the direction indicators, since the selection made by the proper condition determining means is cancelled, it is possible to prevent a determination from being made on a curve on a branch road which the subject vehicle enters in no case.

According to a sixth aspect of the invention, there is provided a vehicle safety running apparatus as set forth in any of the first to fifth aspect of the invention, further comprising a route deviation determining means for determining whether or not the subject vehicle deviates from its set route by comparing a route set by the route setting means with a position of the subject vehicle detected by the subject vehicle position detecting means, wherein the state in which a route guidance based on a set route is not carried out involves where a deviation from the set route is detected by the route deviation determining means.

According to the configuration as described above, whether or not a branch road or curve can be passed through is determined not only where no route to a destination is set but also where the subject vehicle deviates from its set route, and moreover, the possibility that automatic deceleration control and/or alarming the driver is performed excessively can be reduced, thereby making it possible to suppress to a minimum level the physical disorder that the driver may feel.

BRIEF DESCRIPTION OF THE DRAWINGS

FIGS. 5A and 5B are diagrams explaining the cancellation of selections of branch roads based on the operation of a direction indicator lever;

FIGS. 7A to 7E are diagrams respectively explaining the definition of a "bend portion on a road"

DETAILED DESCRIPTION OF THE PREFERED EMBODIMENT

A mode for carrying out the invention will be described below based on an embodiment according to the invention illustrated in the accompanying drawings.

Figure 6A:
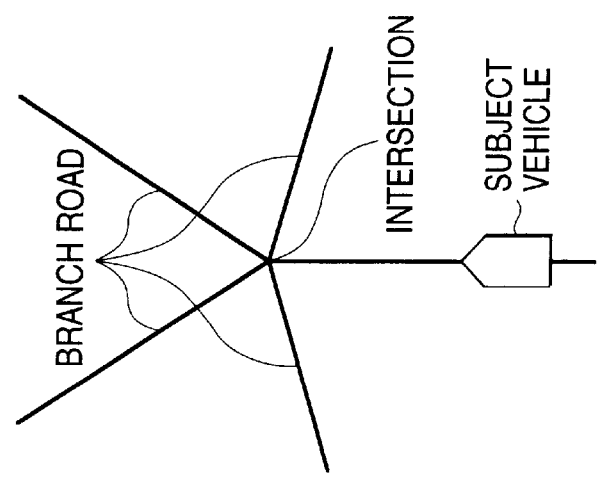
FIGS. 6A to 6C are diagrams respectively explaining the definition of an "intersection" and a "branch road"
Figure 6B:
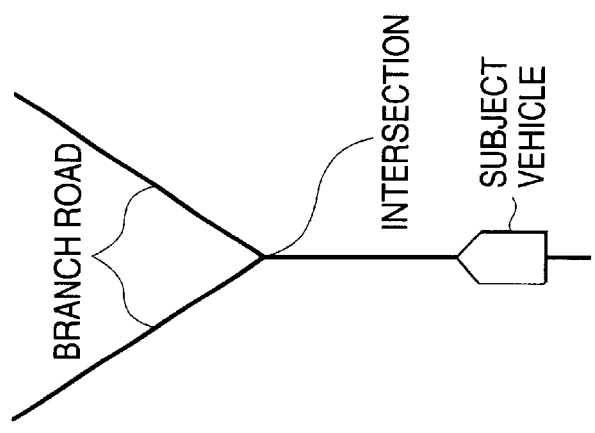
Figure 6C:
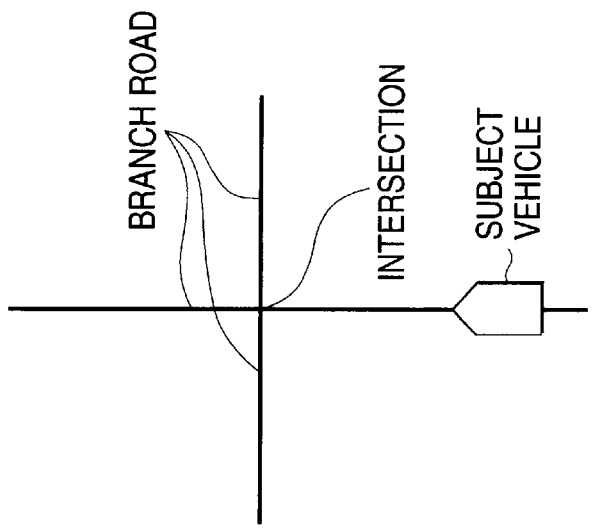
Figure 8:
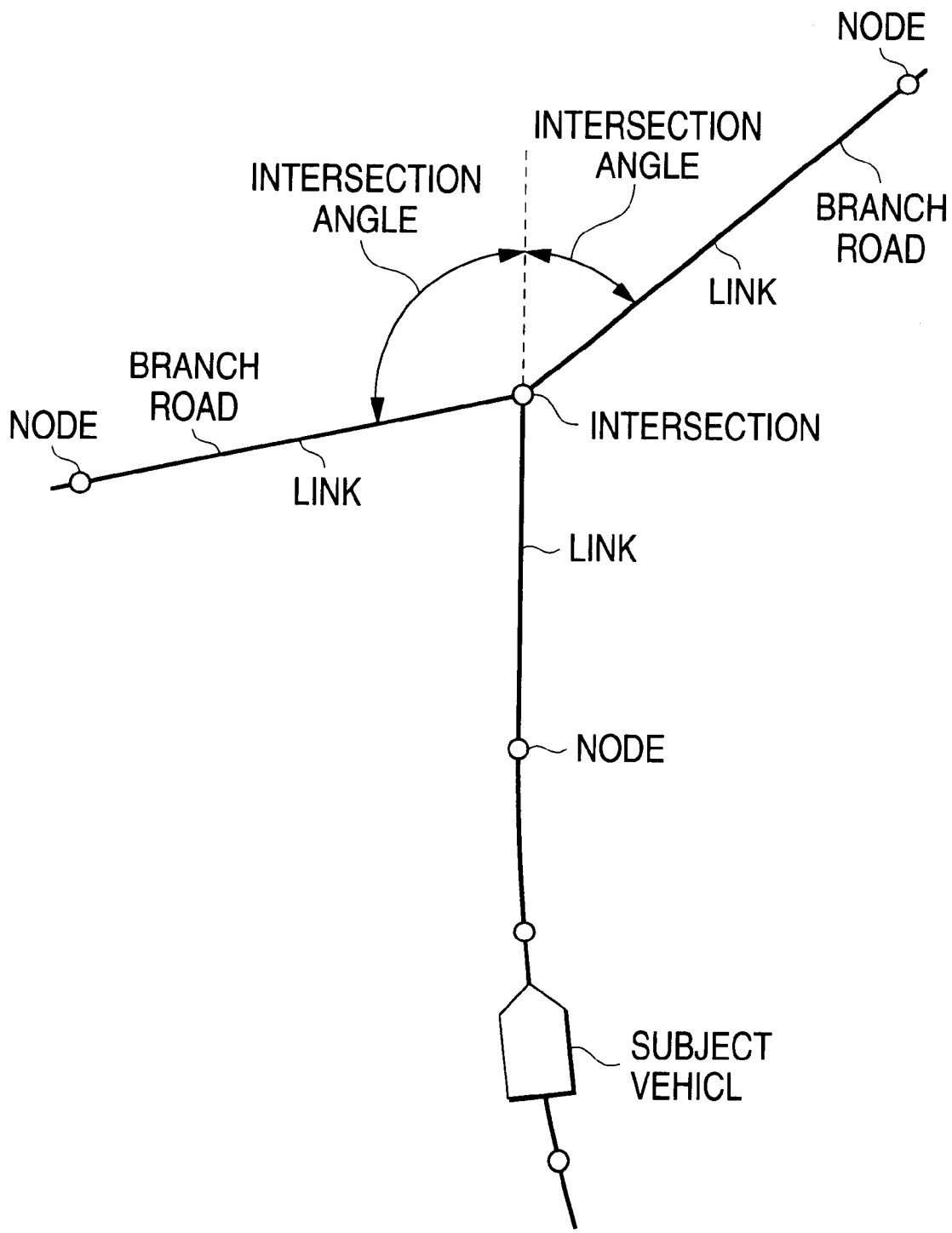
FIG. 8 is a diagram explaining the definition of an "intersection angle of roads"

First of all, terms that are used in this specification will be defined. As shown in FIG. 6, an "intersection" used in the specification includes not only a so-called a crossroad but also a three-fork road (a so-called Y-shaped road) and a five-fork road. In addition, a "branch road" used in the specification indicates roads branched from the intersection to extend therebeyond. As shown in FIG. 7, a "bend portion of a road" used in the specification means a portion of the road where the driver needs to steer the steering wheel in order to pass through the portion and includes both curves (including a bend of an L-shaped road) and intersections. As shown in FIG. 8, an "intersection angle of a road" used in the specification is defined as an angle formed by the direction a road immediately before an intersection along which the subject vehicle is traveling and the direction of a branch road branched the road along which the subject vehicle is traveling at the intersection. To be more specific, road data comprises a plurality of nodes disposed at predetermined intervals and links constituted by lines connecting adjacent nodes, and a node is set at an intersection in principle. Then, the "intersection angle of a road" is defined as an angle formed by the direction of a link immediately before the node at the intersection and the direction of a link immediately beyond the node at the intersection.

Figure 1:
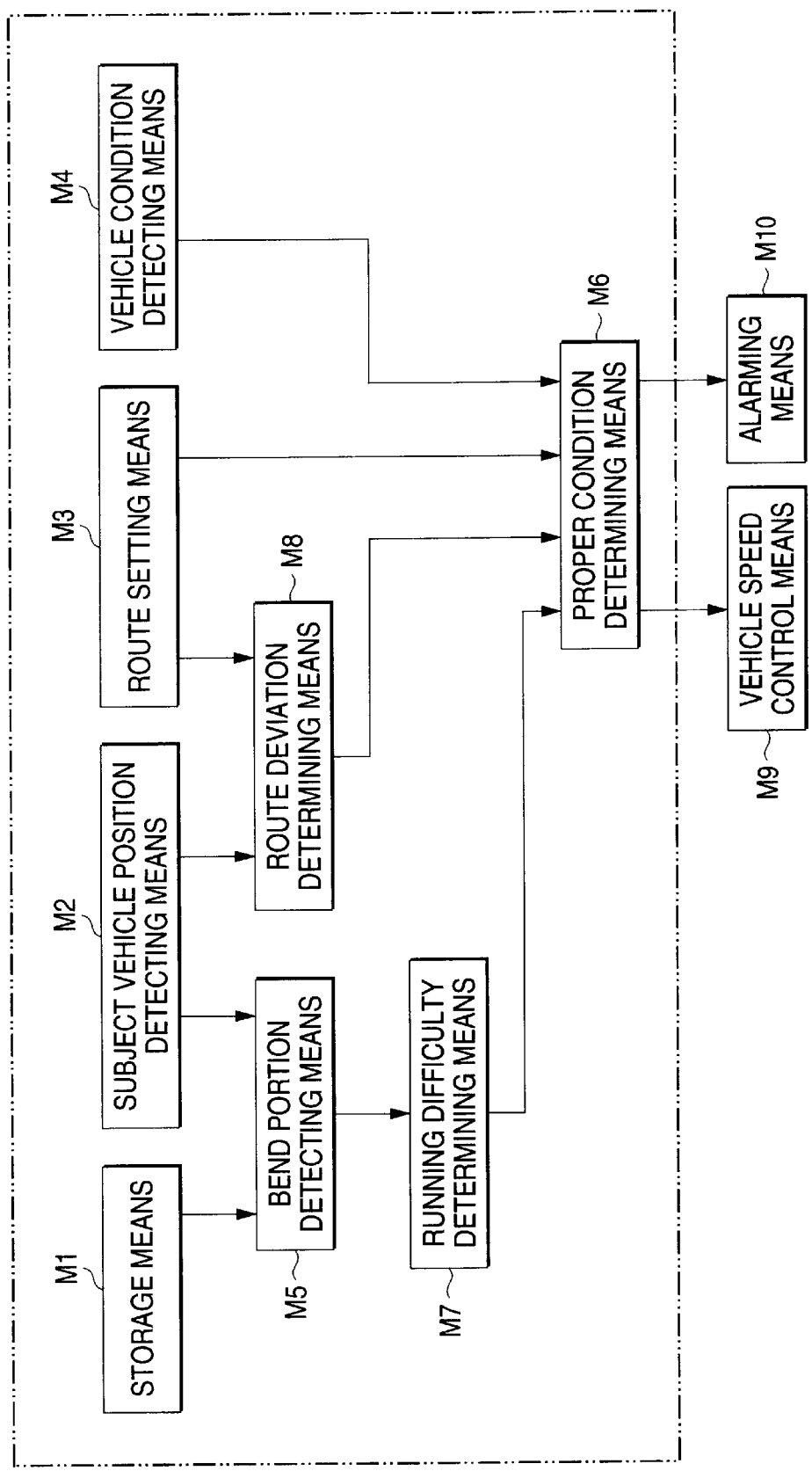
FIG. 1 is a block diagram illustrating the configuration of a vehicle safety running apparatus.

As shown in FIG. 1, a vehicle safety running apparatus according to the present embodiment comprises a storage means M1, a subject vehicle position detecting means M2, a route setting means M3, a vehicle condition detecting means M4, a bend portion detecting means M5, a proper condition determining means M6, a running difficulty detecting means M7 and a route deviation determining means M8. Main portions of a navigation system are also used, as they are, for the storage means M1, the subject vehicle position detecting means M2 and the route setting means M3.

The storage means M1 is constituted by a storage medium such as a CD-ROM for storing road data as a set of coordinate points of a plurality of nodes. The subject vehicle position detecting means M2 detects the position of the subject vehicle based on signal from a satellite used for the global positioning system or GPS. The route setting means M3 sets a running route to a destination for the subject vehicle through an input operation by the driver. The vehicle condition detecting means M4 detects the condition of the subject vehicle based on a vehicle speed detected by a vehicle speed sensor, a lateral acceleration detected by a lateral acceleration sensor, a steering angle detected by a steering angle sensor and the like. Of the respective sensors, the vehicle speed sensor is inevitable. The bend portion detecting means 5 detects a bend portion (that is, a curve and an intersection) of a road existing ahead of the subject vehicle based on the road data stored in the storage means M1 and the position of the subject vehicle detected by the subject vehicle position detecting means M2.

The proper condition determining means M6 compares, when a route to a destination is set by the route setting means M3, the degree of bending (a radius of curvature and/or an intersection angle) of a bend portion on the set route which is detected by the bend portion detecting means M5 with the vehicle condition detected by the vehicle condition detecting means M4 and then determines whether or not the bend portion can be properly passed through with the current vehicle condition being maintained. For example, the proper condition determining means M6 compares the current vehicle speed with a proper vehicle speed which is to be determined according to the radius of curvature of the bend portion obtained from the road data and determines that the bend portion is passable by the subject vehicle if the current vehicle speed is found to be slower than the proper vehicle speed for passing through the bend portion. While, if the current vehicle speed is found to be faster than the proper bend portion passing vehicle speed, the proper condition determining means M6 determines that the bend portion is not passable. Alternatively, the proper condition determining means M6 compares a minimum turning radius of the subject vehicle calculated from the current vehicle speed with the radius of curvature of the bend portion and determines that the bend portion is passable if the minimum turning radius so calculated is found to be equal to or smaller than the radius of curvature of the bend portion. While, if the minimum turning radius is found to be larger than the radius of curvature of the bend portion, the proper condition determining means M6 determines that the bend portion is not passable by the subject vehicle.

Then, when the proper condition determining means M6 determines that the subject vehicle cannot pass through the bend portion with the current vehicle speed, a vehicle speed control means M9 comprising an automatic brake device and/or a throttle opening reduction device is activated so as to automatically reduce the speed of the subject vehicle to thereby allow the subject vehicle to pass through the bend portion properly. Alternatively, an alarming means M10 comprising a buzzer, a chime, a speaker, a lamp or the like is activated to alarm the driver to voluntarily reduce the vehicle speed.

Thus, while a case has been described above where the running route of the subject vehicle to the destination is set by the route setting means M3 and the bend portion through which the subject vehicle is passing can be grasped in advance, in the present embodiment, even in a case where the route setting means M3 sets no running route of the subject vehicle to the destination or a case where while the route setting means M3 se s a running route of the subject vehicle to the destination, the route deviation determining means M8 determines that the subject vehicle deviates from its set route, the running difficulty determining means M7 is configured to then determine a branch road of branch roads branched from an intersection ahead of the subject vehicle which is lowest in terms of the degree of difficulty in running or a branch road which is passable at high speed, and the proper condition determining means M6 is configured to determine whether or not the subject vehicle can pass through the intersection from which the branch road is branched, as well as a curve existing on the branch road beyond the intersection. Note that the route deviation determining means M8 is configured to determine whether or not the subject vehicle deviates from its set route by comparing the set route set by the route setting means M3 and the position of the subject vehicle detected by the subject vehicle position detecting means M2.

Figure 2:
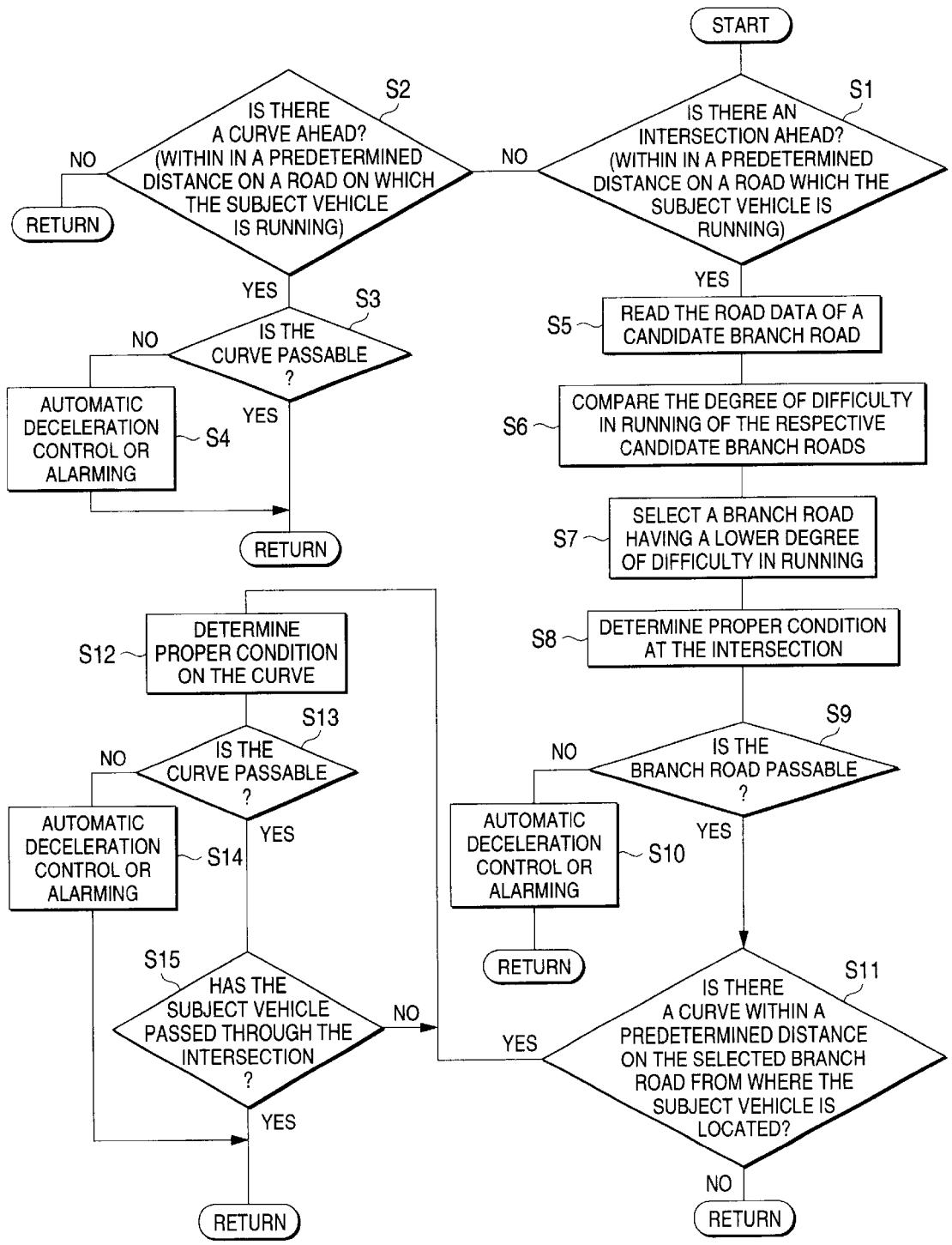
FIG. 2 is a flowchart explaining the operation of the apparatus.
Figure 3:
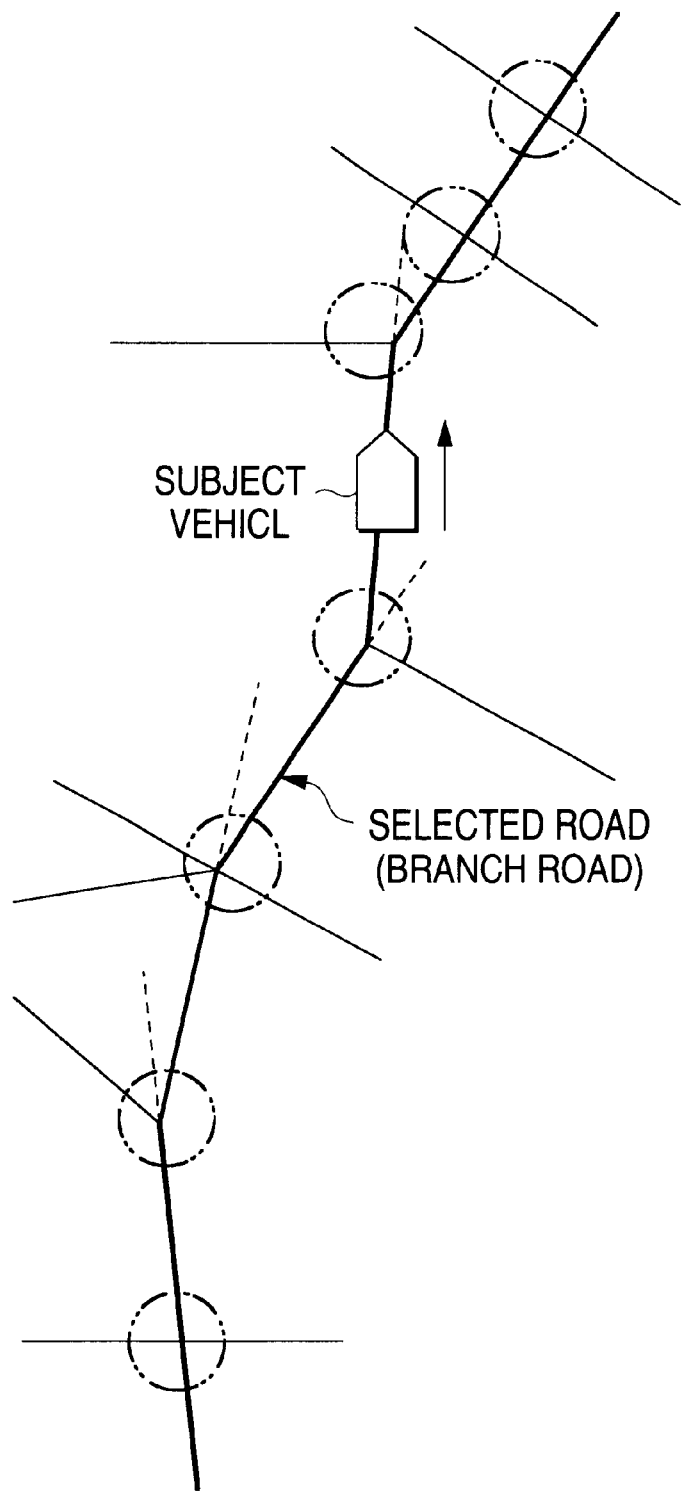
FIG. 3 is a diagram explaining selections of branch roads at intersections.

Described below will be a control in a case where the route setting means M3 sets no running route to a destination for the subject vehicle (including a case where the subject vehicle deviates from its set route during the route guidance) In a case where it is determined in step S1 in a flowchart shown in FIG. 2 that there exists no intersection ahead of the subject vehicle within a predetermined distance, in step S2 that there exists a curve ahead of the subject vehicle within a predetermined distance and in step S3 that the subject vehicle cannot pass through the curve with the current vehicle speed, then in step S4, an automatic deceleration control is executed or an alarm is given to the driver so that the subject vehicle can pass through the curve. In a case where it is determined in step S1 that there exists an intersection ahead of the subject vehicle within the predetermined distance, in step S5, road data on each of branch roads branched from the intersection is read, in the following step S6, the degrees of difficulty in entering the respective branch roads are compared, and in step S7, the branch road is selected which is lowest with respect to the degree of difficulty in running (FIG. 3). The lower the degrees of difficulty in entering the respective branch roads becomes, the smaller the intersection angles (FIG. 8) of the branch roads becomes smaller.

In the following step S8, in a case where the traveling course of the subject vehicle is changed to the branch road selected at the intersection as described in the previous step, whether or not the subject vehicle can pass through the to the selected branch road is determined. The determination of the passableness is effected by comparing the current vehicle speed with a proper vehicle speed determined according to the radius of curvature of the intersection resulting when the change in the traveling course of the subject vehicle is so effected. In the event that the current vehicle speed is found to be slower than the proper vehicle speed, it is determined that the subject vehicle can pass through the intersection, while in the event that the current vehicle speed is found to be faster than the proper vehicle speed, it is determined that the subject vehicle cannot pass through the intersection. As a result, in step S9, when the passableness of the intersection by the subject vehicle is determined negative, in step S10, the automatic deceleration control is then executed or an alarm is given to the driver so that the subject vehicle can pass through the intersection as selected.

Figure 4:
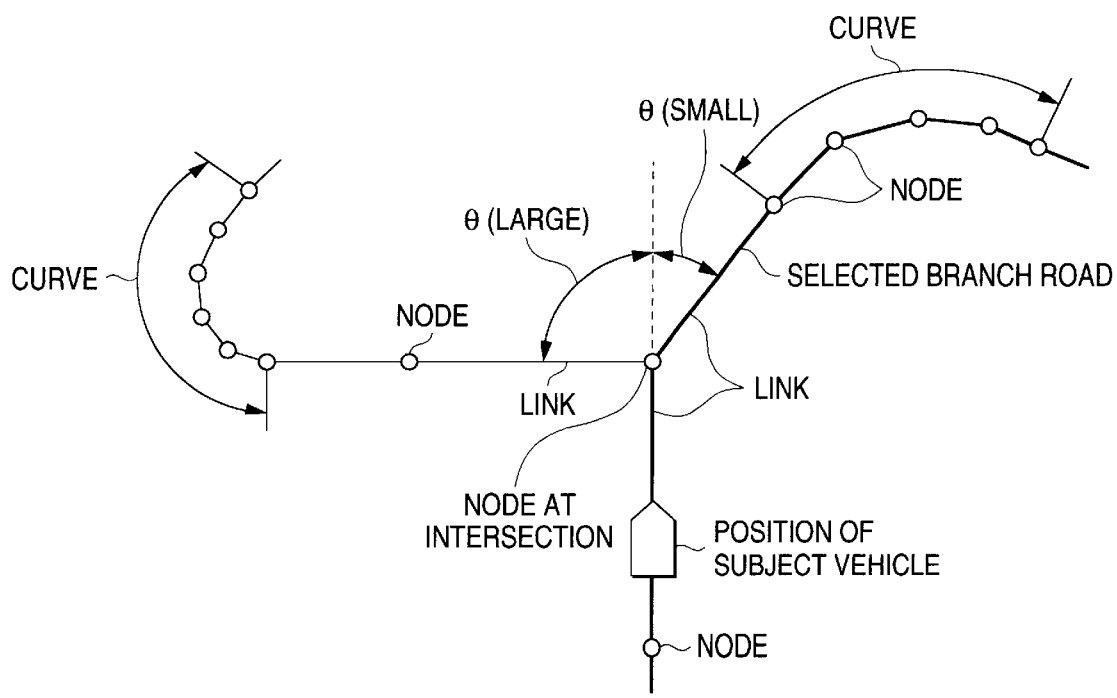
FIG. 4 is a diagram explaining how to determine the passableness of curves on branch roads branched from an intersection.

In contrast, in the event that the intersection is determined as being passable in step S9, if there exists a curve from where the subject vehicle is located before the intersection to within a predetermined distance along the branch road, in step S12, whether or not the curve can be passed through is determined (FIG. 4) The determination is effected by comparing the current vehicle speed with a proper vehicle speed which is determined according to the radius of curvature of the curve. In the event that the current vehicle speed is found to be slower than the proper vehicle speed, then the curve is determined as being passable, while in the event that the current vehicle speed is found to be faster than the proper vehicle speed, the curve is determined as being impassable. As a result, in the event that the curve is determined as being impassable in step S13, then in step S14, the automatic deceleration control is effected or an alarm is given to the driver so that the subject vehicle can pass through the curve, whereby the subject vehicle is prevented from entering the curve existing on the branch road with the excessive vehicle speed. The processes in steps S13 and s14 are to be continued until the subject vehicle can pass through the intersection in step S15. Since there exists no intersection between the subject vehicle and the curve after the subject vehicle has passed through the intersection, the control aimed at the curve is carried out from step S1 to step S14.

Thus, in a case where no route guidance is carried out or a case where the subject vehicle deviates from its set route during the route guidance, since whether or not the subject vehicle can pass through the intersection is determined by selecting the branch road of the plurality of branch roads existing ahead of the subject vehicle on the road which is lowest with respect to the degree of difficulty in running, it is possible not only to determine on the passableness of the intersection even when no route to the destination is set but also to suppress, to a minimum level, the physical disorder that the driver may feel by reducing the possibility that the automatic deceleration control and/or alarming the driver is performed excessively. In addition, even when the subject vehicle enters a branch road other than the one which is lowest with respect to the degree of difficulty in running, since in many cases the driver drives the vehicle without depending upon the route guidance when he or she has already been aware of the existence of an intersection ahead of the subject vehicle or is then determined on which direction to take at the intersection, it is unlikely to happen that the subject vehicle enters the branch road which is difficult to pass through with an excessive vehicle speed being maintained.

In addition, in the event that the subject vehicle enters a branch road other than a selected one, as soon as it occurs, the determination on the passableness of a target curve on the selected branch road is cancelled. Additionally, in the event that the direction indicator lever is operated such that the direction indicators of the subject vehicle indicate that the vehicle is entering a branch road other than a selected one, the branch road indicated by the direction indicators is newly selected, and any selection made before then is cancelled (refer to FIG. 5), thereby making it possible to prevent unnecessary determinations from being made on the passableness of branch roads along which the subject vehicle is most unlikely to pass.

Thus, while the embodiment of the invention has been described in detail heretofore, the design of the invention may be modified variously without departing from the spirit and scope thereof.

For example, the subject vehicle position detecting means M2 is not limited to the one for detecting the position of the subject vehicle based on signals from satellites used for GPS and may take the form of a means for detecting the position of the subject vehicle through a self-navigation system or a means for detecting the position of the subject vehicle with signals from transmission means such as beacons provided along roads.

According to the first aspect of the invention, since a branch road of branch roads at an intersection ahead of the subject vehicle along a road on which the subject vehicle is traveling which has the lowest degree of difficulty in running is selected to determine whether or not the subject vehicle can pass therethrough in the state in which the route guidance along a set route is not carried out, it is possible to determine whether or not the subject vehicle can pass through the branch road even in a case where no route to a destination is not set. Moreover, the possibility that automatic deceleration control and/or alarming is performed excessively can be reduced by selecting a branch road which is easy for the subject vehicle to pass through, thereby making it possible to suppress, to a minimum level, the physical disorder that the driver may feel. In addition, even in the event that the subject vehicle happens to enter a branch road which is difficult for the subject vehicle to pass through, since in many cases the driver drives the vehicle without depending on the route guidance when he or she has already been aware of the existence of an intersection ahead of the subject vehicle or is then determined on which turn to take at the intersection, it is most unlikely that the subject vehicle enters the branch road which is difficult for it to pass through with excessive vehicle speed.

Additionally, according to the second aspect of the invention, it is possible to determine exactly a branch road having a lowest degree of difficulty in running by selecting a branch road having a smallest intersection angle formed by links located before and after a node set at an intersection.

Furthermore, according to the third aspect of the invention, since whether or not the subject vehicle can pass through the selected curve on the branch road is determined, it is possible to perform an accurate automatic deceleration control and/or give an alarm to the driver by determining whether or not a curve along which the subject vehicle is anticipated to pass.

Moreover, according to the fourth aspect of the invention, when the subject vehicle advances on a branch road other than the selected branch road, since the determination of the passableness of the selected curve on the selected branch road is cancelled, it is possible to prevent the execution of the automatic deceleration control and/or alarming the driver for the curve along which the subject vehicle is passing in no case then.

In addition, according to the fifth aspect of the invention, in a case where a branch road selected by the proper condition determining means is different from a branch road indicated by the direction indicators, since the selection made by the proper condition determining means is cancelled, it is possible to prevent a determination from being made on a curve on a branch road which the subject vehicle enters in no case.

According to the sixth aspect of the invention, whether or not a branch road or curve can be passed through is determined not only where no route to a destination is set but also where the subject vehicle deviates from its set route, and moreover, the possibility that automatic deceleration control and/or alarming the driver is performed excessively can be reduced, thereby making it possible to suppress to a minimum level the physical disorder that the driver may feel.

What is claimed is:

1. A vehicle safety running apparatus comprising:
    storage means (M1) for storing road data including intersections;
    subject vehicle position detecting means (M2) for detecting the position of a subject vehicle;

route setting means (M3) for setting a route to a destination;

vehicle condition detecting means (M4) for detecting a vehicle condition of said subject vehicle including at least a vehicle speed thereof;

bend portion detecting means (M5) for detecting curves and intersections existing along a traveling direction of said subject vehicle based on a road data stored in said storage means and the subject vehicle position detected by said subject vehicle position detecting means (M2); and proper condition determining means (M6) for calculating, based on information on curves and intersections detected by said bend portion detecting means (M5), proper vehicle conditions for passing through said curves and intersections, and determining whether or not said subject vehicle can properly pass through said curves and intersections based on the result of a comparison of the proper vehicle condition calculated with the vehicle condition detected by said vehicle condition detecting means (M4); and running difficulty determining means (M7) for determining a degree of difficulty in running on a road on which said subject vehicle is traveling, wherein when said bend portion detecting means (M5) detects an intersection branching into a plurality of branch roads in a state in which a route guidance based on a set route is not carried out, said proper condition determining means (M6) selects a branch road determined by said running difficulty determining means (M7) as having a lowest degree of difficulty in running and determining whether or not said subject vehicle can pass through said branch road.

2. The vehicle safety running apparatus according to claim 1, wherein said storage means (M1) is configured to store road data through nodes and links, and wherein said running difficulty determining means (M7) is configured to determine that a branch road having a smaller intersecting angle formed by links immediately before and after a node set at an intersection is lower in the degree of difficulty in running.

3. The vehicle safety running apparatus according to claim 1, wherein said proper condition determining means (M6) determines whether or not a curve on a branch road selected by said proper condition determining means can be passed along.

4. The vehicle safety running apparatus according to claim 3, wherein said proper condition determining means (M6) cancels the determination on whether or not said curve on said branch road selected by said proper condition determining means can be passed along when said subject vehicle starts to advance on a branch road other than said branch road selected by said proper condition determining means.

5. The vehicle safety running apparatus according to claim 1, comprising a direction indicator unit, wherein said proper condition determining means (M6) cancels the selection of a branch road when said direction indicator unit indicates, before said intersection, that said subject vehicle is advancing on a branch road other than a branch road selected by said proper condition determining means (M6).

6. The vehicle safety running apparatus according to claim 1, further comprising route deviation determining means (M8) for determining whether or not said subject vehicle deviates from a set route by comparing a route set by said route setting means (M3) with a position of said subject vehicle detected by said subject vehicle position detecting means (M2), wherein said state in which a route guidance based on a set route is not carried out involves where a deviation from said set route is detected by said route deviation determining means (M8).

* * * * *